(12) United States Patent
Almasi et al.

(10) Patent No.: US 7,984,448 B2
(45) Date of Patent: Jul. 19, 2011

(54) MECHANISM TO SUPPORT GENERIC COLLECTIVE COMMUNICATION ACROSS A VARIETY OF PROGRAMMING MODELS

(75) Inventors: Gheorghe Almasi, Ardsley, NY (US); Gabor Dozsa, Ardsley, NY (US); Sameer Kumar, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 11/768,669

(22) Filed: Jun. 26, 2007

(65) Prior Publication Data

US 2009/0006810 A1    Jan. 1, 2009

(51) Int. Cl.
*G06F 9/44*        (2006.01)
*G06F 9/46*        (2006.01)
*G06F 15/76*       (2006.01)

(52) U.S. Cl. .......... 719/313; 712/35; 718/100; 718/102; 719/328

(58) Field of Classification Search .................. 719/313, 719/328; 718/100, 102; 712/35
See application file for complete search history.

(56) References Cited

U.S. PATENT DOCUMENTS

| | | |
|---|---|---|
| 4,777,595 A | 10/1988 | Strecker et al. |
| 5,063,562 A | 11/1991 | Barzilai et al. |
| 5,142,422 A | 8/1992 | Zook et al. |
| 5,349,587 A | 9/1994 | Nadeau-Dostie et al. |
| 5,353,412 A | 10/1994 | Douglas et al. |
| 5,452,432 A | 9/1995 | Macachor |
| 5,524,220 A | 6/1996 | Verma et al. |
| 5,634,007 A | 5/1997 | Calta et al. |
| 5,659,710 A | 8/1997 | Sherman et al. |
| 5,708,779 A | 1/1998 | Graziano et al. |
| 5,761,464 A | 6/1998 | Hopkins |
| 5,796,735 A | 8/1998 | Miller et al. |
| 5,809,278 A | 9/1998 | Watanabe et al. |
| 5,825,748 A | 10/1998 | Barkey et al. |
| 5,890,211 A | 3/1999 | Sokolov et al. |
| 5,917,828 A | 6/1999 | Thompson |
| 6,023,732 A | 2/2000 | Moh et al. |
| 6,061,511 A | 5/2000 | Marantz et al. |
| 6,072,781 A | 6/2000 | Feeney et al. |
| 6,122,715 A | 9/2000 | Palanca et al. |
| 6,185,214 B1 | 2/2001 | Schwartz et al. |

(Continued)

OTHER PUBLICATIONS

Yu "Enhancing MPI with Modern Networking Mechanisms in Cluster Interconnects" 2006, 188 pages.*

(Continued)

*Primary Examiner* — Van H Nguyen
(74) *Attorney, Agent, or Firm* — Scully, Scott, Murphy & Presser, P.C.; Daniel P. Morris, Esq.

(57) ABSTRACT

A system and method for supporting collective communications on a plurality of processors that use different parallel programming paradigms, in one aspect, may comprise a schedule defining one or more tasks in a collective operation, an executor that executes the task, a multisend module to perform one or more data transfer functions associated with the tasks, and a connection manager that controls one or more connections and identifies an available connection. The multisend module uses the available connection in performing the one or more data transfer functions. A plurality of processors that use different parallel programming paradigms can use a common implementation of the schedule module, the executor module, the connection manager and the multisend module via a language adaptor specific to a parallel programming paradigm implemented on a processor.

17 Claims, 3 Drawing Sheets

U.S. PATENT DOCUMENTS

| | | |
|---|---|---|
| 6,219,300 B1 | 4/2001 | Tamaki |
| 6,263,397 B1 | 7/2001 | Wu et al. |
| 6,295,571 B1 | 9/2001 | Scardamalia et al. |
| 6,311,249 B1 | 10/2001 | Min et al. |
| 6,324,495 B1 | 11/2001 | Steinman |
| 6,356,106 B1 | 3/2002 | Greeff et al. |
| 6,366,984 B1 | 4/2002 | Carmean et al. |
| 6,442,162 B1 | 8/2002 | O'Neill et al. |
| 6,466,227 B1 | 10/2002 | Pfister et al. |
| 6,564,331 B1 | 5/2003 | Joshi |
| 6,594,234 B1 | 7/2003 | Chard et al. |
| 6,598,123 B1 | 7/2003 | Anderson et al. |
| 6,601,144 B1 | 7/2003 | Arimilli et al. |
| 6,631,447 B1 | 10/2003 | Morioka et al. |
| 6,647,428 B1 | 11/2003 | Bannai et al. |
| 6,662,305 B1 | 12/2003 | Salmon et al. |
| 6,735,174 B1 | 5/2004 | Hefty et al. |
| 6,775,693 B1 | 8/2004 | Adams |
| 6,799,232 B1 | 9/2004 | Wang |
| 6,880,028 B2 | 4/2005 | Kurth |
| 6,889,266 B1 | 5/2005 | Stadler |
| 6,894,978 B1 | 5/2005 | Hashimoto |
| 6,954,887 B2 | 10/2005 | Wang et al. |
| 6,986,026 B2 | 1/2006 | Roth et al. |
| 7,007,123 B2 | 2/2006 | Golla et al. |
| 7,058,826 B1 | 6/2006 | Fung |
| 7,065,594 B2 | 6/2006 | Ripy et al. |
| 7,143,219 B1 | 11/2006 | Chaudhari et al. |
| 7,191,373 B2 | 3/2007 | Wang et al. |
| 7,239,565 B2 | 7/2007 | Liu |
| 7,280,477 B2 | 10/2007 | Jeffries et al. |
| 7,298,746 B1 | 11/2007 | De La Iglesia et al. |
| 7,363,629 B2 | 4/2008 | Springer et al. |
| 7,373,420 B1 | 5/2008 | Lyon |
| 7,401,245 B2 | 7/2008 | Fischer et al. |
| 7,454,640 B1 | 11/2008 | Wong |
| 7,454,641 B2 | 11/2008 | Connor et al. |
| 7,461,236 B1 | 12/2008 | Wentzlaff |
| 7,463,529 B2 | 12/2008 | Matsubara |
| 7,539,845 B1 | 5/2009 | Wentzlaff et al. |
| 7,613,971 B2 | 11/2009 | Asaka |
| 7,620,791 B1 | 11/2009 | Wentzlaff et al. |
| 7,698,581 B2 | 4/2010 | Oh |
| 2001/0055323 A1 | 12/2001 | Rowett et al. |
| 2002/0078420 A1 | 6/2002 | Roth et al. |
| 2002/0087801 A1 | 7/2002 | Bogin et al. |
| 2002/0100020 A1 | 7/2002 | Hunter et al. |
| 2002/0129086 A1 | 9/2002 | Garcia-Luna-Aceves et al. |
| 2002/0138801 A1 | 9/2002 | Wang et al. |
| 2002/0156979 A1 | 10/2002 | Rodriguez |
| 2002/0184159 A1 | 12/2002 | Tadayon et al. |
| 2003/0007457 A1 | 1/2003 | Farrell et al. |
| 2003/0028749 A1 | 2/2003 | Ishikawa et al. |
| 2003/0050714 A1 | 3/2003 | Tymchenko |
| 2003/0050954 A1 | 3/2003 | Tayyar et al. |
| 2003/0074616 A1 | 4/2003 | Dorsey |
| 2003/0105799 A1 | 6/2003 | Khan et al. |
| 2003/0163649 A1 | 8/2003 | Kapur et al. |
| 2003/0172368 A1* | 9/2003 | Alumbaugh et al. ......... 717/106 |
| 2003/0177335 A1 | 9/2003 | Luick |
| 2003/0188053 A1 | 10/2003 | Tsai |
| 2003/0235202 A1 | 12/2003 | Van Der Zee et al. |
| 2004/0003184 A1 | 1/2004 | Safranek et al. |
| 2004/0019730 A1 | 1/2004 | Walker et al. |
| 2004/0024925 A1 | 2/2004 | Cypher et al. |
| 2004/0073780 A1 | 4/2004 | Roth et al. |
| 2004/0103218 A1 | 5/2004 | Blumrich et al. |
| 2004/0210694 A1 | 10/2004 | Shenderovich |
| 2004/0243739 A1 | 12/2004 | Spencer |
| 2005/0007986 A1 | 1/2005 | Malladi et al. |
| 2005/0053057 A1 | 3/2005 | Deneroff et al. |
| 2005/0076163 A1 | 4/2005 | Malalur |
| 2005/0160238 A1 | 7/2005 | Steely et al. |
| 2005/0216613 A1 | 9/2005 | Ganapathy et al. |
| 2005/0251613 A1 | 11/2005 | Kissell |
| 2005/0270886 A1 | 12/2005 | Takashima |
| 2005/0273564 A1 | 12/2005 | Lakshmanamurthy et al. |
| 2006/0050737 A1 | 3/2006 | Hsu |
| 2006/0080513 A1 | 4/2006 | Beukema et al. |
| 2006/0206635 A1 | 9/2006 | Alexander et al. |
| 2006/0248367 A1 | 11/2006 | Fischer et al. |
| 2007/0055832 A1 | 3/2007 | Beat |
| 2007/0133536 A1 | 6/2007 | Kim et al. |
| 2007/0168803 A1 | 7/2007 | Wang et al. |
| 2007/0174529 A1 | 7/2007 | Rodriguez et al. |
| 2007/0195774 A1 | 8/2007 | Sherman et al. |
| 2008/0147987 A1 | 6/2008 | Cantin et al. |

OTHER PUBLICATIONS

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n.6, p. 49-58, Jun. 1990.

Michel, Dubois, Christoph Scheurich, Faye A. Briggs, Synchronization, Coherence, and Event Ordering in Multiprocessors, Computer, v.21 n.2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, Vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

Definition of "mechanism", Oxford English Dictionary, http://dictionany.oed.com/cgi/entry/00304337?query_type=word&queryword=mechanism&first=1&max_to_show=10&sort_type=alpha&result_place=2&search_id=y2atEIGc-11603&hilite+00304337, Draft Revision Mar. 2010.

* cited by examiner

MECHANISM TO SUPPORT GENERIC COLLECTIVE COMMUNICATION ACROSS A VARIETY OF PROGRAMMING MODELS

STATEMENT REGARDING FEDERALLY SPONSORED RESEARCH OR DEVELOPMENT

This invention was made with Government support under Contract. No. B554331 awarded by Department of Energy. The Government has certain rights in this invention.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUB-GROUP PARITY PROTECTION"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

FIELD OF THE INVENTION

The present disclosure relates generally to parallel computer, and more particularly to a method and system for supporting generic collective communication across a variety of programming models.

BACKGROUND OF THE INVENTION

Parallel computer applications often use message passing to communicate between processors. Message passing utilities such as the Message Passing Interface (MPI) support two types of communication: point-to-point and collective. In point-to-point messaging a processor sends a message to another processor that is ready to receive it. In a collective communication operation, however, many processors participate together in the communication operation. Examples of collective operations are broadcast, barrier, all-to-all, etc.

Each collective communication operation needs to be optimized to maximize performance. The known methodologies implement the collective communication operations through separate calls and in a separate software stack. Most typical implementations are specific to hardware or part of specific languages or runtimes. Such implementation methods result in high development and maintenance overheads. In addition, in known methodologies, this type of implementations is repeated for every new version of a parallel computer. For different parallel computers or different versions of a parallel computer, several different parallel programming paradigms need to be supported and each of them may define its own collective primitives. Each of these requires separate implementations and optimized runtimes.

Thus, a framework that isolates the fundamental components of collective communication to minimize the development effort across different parallel programming languages and supercomputer architectures is desirable.

BRIEF SUMMARY OF THE INVENTION

System and method for supporting collective communications on a plurality of processors that use different parallel programming paradigms are provided. The system, in one aspect, may comprise a schedule module operable to define one or more tasks in a collective operation, an executor module operable to execute said one or more tasks, a multisend module operable to perform one or more data transfer functions in said one or more tasks, a connection manager operable to control one or more connections and identify an available connection. The multisend module is further operable to use the available connection in performing the one or more data transfer functions. The system may also include a language adaptor operable to interface at least to the multisend module. A plurality of processors that use different parallel programming paradigms may use a common implementation of the schedule module, the executor module, the connection manager and the multisend module via the language adaptor specific to a parallel programming paradigm.

A method of supporting collective communications on a plurality of processors that use different parallel programming paradigms, in one aspect, may comprise receiving an application call invoking a collective operation from a processor via a language adaptor, creating a schedule defining one or more tasks in a collective operation, creating a executor for executing said one or more tasks; and invoking a multisend operation to perform a communication tasks associated with said one or more tasks.

In another aspect, a method of supporting collective communications on a plurality of processors that use different parallel programming paradigms, may comprise receiving a plurality of application calls invoking a collective operation from a plurality of processors using different parallel programming language, each of the plurality of application calls being received via a language adaptor specific to a parallel programming language implemented in a processor. The method may also include, for each of the plurality of application calls, creating a schedule defining one or more tasks in a collective operation associated with an application call, creating a executor for executing said one or more tasks, and invoking a multisend operation to perform a communication tasks associated with said one or more tasks.

Yet in another aspect, a program storage device readable by a machine, tangibly embodying a program of instructions executable by the machine to perform a method of supporting collective communications on a plurality of processors that use different parallel programming paradigms may comprise receiving an application call invoking a collective operation from a processor via a language adaptor, creating a schedule defining one or more tasks in a collective operation, creating a executor for executing said one or more tasks, and invoking a multisend operation to perform a communication tasks associated with said one or more tasks.

Further features as well as the structure and operation of various embodiments are described in detail below with reference to the accompanying drawings. In the drawings) like reference numbers indicate identical or functionally similar elements.

DETAILED DESCRIPTION

The system and method of the present disclosure in one embodiment modularize and support a plurality of functionalities and sub-functionalities in providing a collective framework that can be used across different parallel computers that use different message passing programming languages or models. Modules or functionalities of the collective framework in one embodiment may include: 1) programming language semantics, which handles sub-functionalities such as collective API (application programming interface) and synchronization modes; 2) data transfer functionality; 3) collective operations and algorithms functionality, which may include sub-functionalities such as phase-by-phase traversal of virtual and physical topologies, and network optimizations; 4) specific optimization functionalities such as pipelining, phase independence, and multi-color routes.

Figure 1:
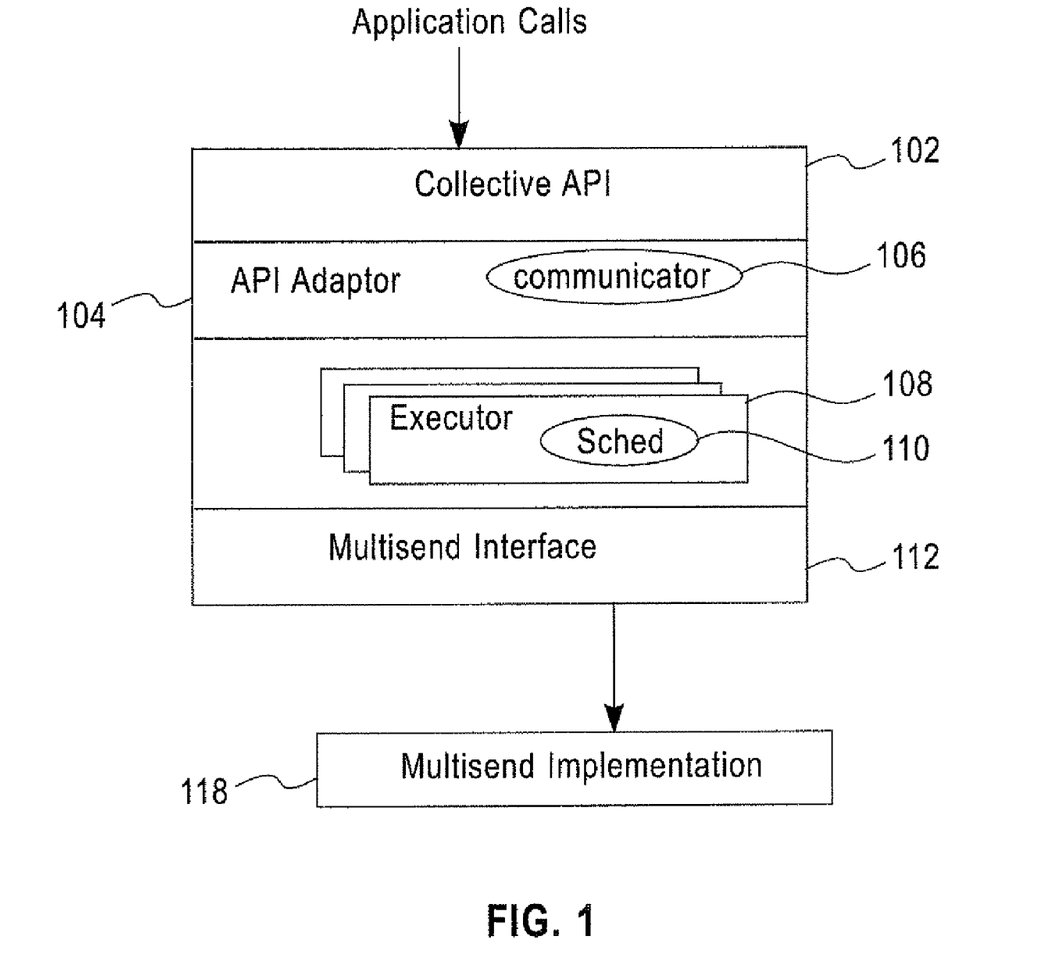
FIG. 1 illustrates a set of components that supports a common paradigm of the present disclosure in one embodiment.

FIG. 1 illustrates a set of components that supports a common paradigm of the present disclosure in one embodiment. A common paradigm may be in a form of a programming language, methodology, memory model, synchronization model, methodology to formulate a software module, etc. The set of components that enables the common paradigm in one embodiment is extendable to many other programming paradigms on multiple parallel architectures. The components in one embodiment may be implemented as class and/or template libraries.

A schedule 110, for instance, handles a functionality of collective operations and algorithms. A schedule 110 includes a set of steps in the collective algorithm that executes a collective operation. Collective operation may be a call in MPI, such as broadcast, allreduce, and other calls. Collective algorithm describes how the collective is done, for example, spanning tree broadcast algorithm. A schedule 110 traverses graphs and topologies of nodes in the parallel computer. In one embodiment, the schedule is generated for each node in the collective operation. The schedule may depend on the rank of the node and the rank of the root of the collective. Briefly, ranks identify processes participating in the message passing operation.

A schedule 110 may split a collective operation into phases. For example, a broadcast can be done through a spanning tree schedule where in each phase a message is sent from one node to the next level of nodes in the spanning tree. In each phase, a schedule 110 lists sources that will send a message to a processor and a list of tasks that need to be performed in that phase. Examples of tasks may be sending messages or performing arithmetic operations. A schedule may be implemented as a C++ class, which may be called by an executor. An executor 108 then performs the list of tasks specified by the schedule 110.

An executor 108 may handle functionalities for specific optimizations such as pipelining, phase independence and multi-color routes, but not limited to only those optimizations. An executor 108 may query a schedule on the list of tasks and execute the list of tasks returned by the schedule. An executor 108 may also handle pipelining and specific optimizations for each collective operation. Typically, each collective operation is assigned one executor.

A multisend interface 112 provides an interface to multisend. The collective framework of the present disclosure in one embodiment may call the multisend interface 112. The interface may be implemented on a specific architecture, for example, the BlueGene/P multisend implementation 118. For example, in the Blue Gene/P product there may be provided a multisend implementation to allow the collective framework to be available on Blue Gene/P.

A multisend is a message passing backbone of a collective framework in the system and method of the present disclosure in one embodiment that provides data transfer functionalities. Multisend functionality allows sending many messages at the same time, each message or a group of messages identified by a connection identifier Multisend provides connection functionalities for a distinct stream of data. It is typically one to many or even many to many message passing event. Multisend functionality also allows an application to multiplex data on this connection identifier.

In one embodiment of the present disclosure, multisend provides point-to-point message passing capabilities with many messages being sent. In this embodiment, the data is only sent between a pair of processors. The receiving processor needing to process the message processes the message and chooses to forward it only on a different multisend call. Thus, in one embodiment of a multisend functionality of the present disclosure, data is not forwarded automatically. In addition, connections are managed externally and no communicators are required. That is, in one embodiment, multisend is independent of communicators, as it may not require a group or communicator to be setup before the multisend is called. A call to multisend lists all the processors that need to participate.

Such implementation of a multisend functionality provides a good match for massive parallel computer system (e.g., BlueGene/P) hardware or other architectures with slow cores because the message posting and startup overheads are amortized across many messages. Multisend interface 112 allows a code implementing collective operations to be device independent. Each multisend may be a phase of a given collective operation.

A processor may multicast a message to many other destinations in a multisend call. For example, a processor of rank 0 can multicast data to processors of ranks 10, 20, 30, 40 in one call. The data from the processor of rank 0 are then received by processors of ranks 10, 20, 30, 40 in their respective local buffers on completion of the multisend call. On the Blue Gene/P torus network a multisend can be used to send a deposit bit send to destinations along a dimension of a torus. For example, a processor can make a deposit bit multisend call to all its X neighbors on the torus. No predetermined groups are needed for the multisend call. A processor can issue multisends to any destinations.

A multisend of the present disclosure in one embodiment communicates to multiple nodes via a single message request. Send mechanism may involve sending data originating from at least one node to one or more destinations, in which the data from different sources is distinguished at destinations using a tuple that includes at least a stream or connection identifier. The tuple may include <source, destination, connection identifier>. The multisend interface at the destination passes the data using this tuple to the schedule/executor waiting for that data.

When several processors issue multisend calls to the same destination processor, that destination processor would need to manage these different streams of data. In one embodiment, each node keeps a connection list and if the different sources send data on different connections, the data can be distinguished from one and another using the connection list and identifiers. A system and method of the present disclosure in one embodiment provides and uses a connection manager component to choose the connections for each multisend call. A connection manager in one embodiment controls a connection identifier for each multisend operation. For example, many classes of a collective operation with the same schedule and executor can overlap with each other with different connection identifiers generated by the connection manager. A connection manager may maintain a list of available connections between a pair of processors and hand each multisend call an available connection. When all connections are in use, a multisend call can wait for a connection to become available. Connections are identified by connection identifiers in one embodiment.

A language adaptor 104 interfaces the collective framework to a programming language. For example, a language adaptor such as for a message passing interface (MPI) has a communicator component 106. Briefly, an MPI communicator is an object with a number of attributes and rules that govern its creation, use, and destruction, The communicator determines the scope and the "communication universe" in which a point-to-point or collective operation is to operate. Each communicator contains a group of valid participants and the source and destination of a message is identified by process rank within that group. Communicators are dynamic, that is, they can be created and destroyed during program execution. A language adaptor may also define an API 104, which is suitable for that programming language. The API for Unified Parallel C (UPC) collectives is likely to be different from MPI collectives.

Each application or programming language may implement a collective API 102 to invoke or call collective operation functions. A user application for example implemented in that application programming language then may make the appropriate function calls for the collective operations. Collective operations may be then performed via an API adaptor 104 using its internal components such as an MPI communicator 106 for MPI in addition to the components in the collective framework like schedules executors multisends and connection managers.

Once all components have been implemented, only the language adaptor needs to be different for each programming language. Thus, all components except for the language adaptor may be reused across different processors on multiple parallel computers, even on those that use different programming languages or models. Thus, the system and method of the present disclosure in one embodiment abstracts collective communication into components. The scheme presented herein is general and applicable to most parallel computer hardware and most programming languages. It provides "program once and use at many scenarios" paradigm.

The common paradigm for collective operations of the present disclosure in one embodiment supports various semantics, algorithms, optimizations, and data transfer in effecting collective operations. In a collective communication operation, a group of processors (either from a predetermined communicator or on the fly) participate to do a global operation where each of them either receives data or contributes to that operation.

Semantics

The different programming languages have their own semantics with regard to collectives. The following illustrates examples of semantics that the system and method of the present disclosure in one embodiment supports in its framework.

1. Synchrony vs. Asynchrony: In a synchronous collective operation all processors have to reach the collective before any data movement happens on the network. For example, all processors need to make the collective API or function call before any data movement happens on the network. Synchronous collectives also ensure that all processors are participating in one or more collective operations that can be determined locally. In an asynchronous collective operation, there are no such restrictions and processors can start sending data as soon as they reach the collective operation. With asynchronous collective operations several collectives can be happening simultaneously at the same time.

2. Blocking vs. Non-blocking: With blocking collectives the processor blocks on the collective and hence can process the messages for the collective as soon as they come in. In case of a reduce operation the processor can also perform arithmetic. With a non-blocking collective the processor initiates the collective and periodically polls the messaging software to make progress on the collective. This allows the processor to compute while the collective is on the network in progress.

3. Groups vs. On-the-fly: A collective operation may be performed on a pre-negotiated or pre-established group of nodes on the parallel computer network, for instance, like a communicator in MPI which is established beforehand. In some programming paradigms a collective operation can happen on the fly where an incoming message carries enough information to build the group for that collective operation on arrival.

4. Collective API: Each programming language may choose to define its own collective Application Programmer Interface.

Collective Algorithm

A collective algorithm is a set of steps to perform a specific collective operation. It usually involves a group of processors interacting with each other in a specific order forming a virtual-topology. The virtual topology can then be aligned to the physical-topology of the communication network interconnecting the processors. A schedule functionality of the present disclosure shown in FIG. 1 may provide this functionality.

The following illustrates examples of collective operations that the system and method of the present disclosure in one embodiment supports in its framework. Collective operations supported in the system and method of the present disclosure are not limited to only those shown here.

1. Broadcast: A broadcast is defined by a root sending a message to a group of processors. The semantics of the broadcast are defined by an individual programming language. A language adaptor of the present disclosure interfaces the semantics that are specific to the individual programming language to the generic collective framework of the present disclosure.

2. Barrier: In a barrier operation a processor leaves the barrier only after all the participating processors have come to the barrier.

3. Reduce: In a reduce operation several nodes contribute data to be globally summed. The output of the reduction is returned on the root.

4. All-reduce: An all-reduce is similar to the reduce operation, but the output is returned on all the nodes. In some cases, an all-reduce can be designed as a reduce followed by a broadcast.

5. All-to-all: Each node sends a different message to every other node.

Specific Optimizations

For each collective operation there could be many specific optimizations that are exclusive to that operation. Examples of optimizations that is supported in the system and method of the present disclosure may include but are not limited to pipelining, multi-color collectives, and phase independence.

Pipelining optimization can be applied to broadcast, reduce and all-reduce collectives. Here the collective is performed in small chunks and moved to intermediate nodes while the starting nodes work on the next chunk.

In a multi-color collective, data moves along multiple edge-disjoint routes of a dense interconnection network. A collective operation can be parallelized across the different independent routes. Multi color collective is generally known and may be supported by framework of the present disclosure. An example of a multi-color collective may include, but is not limited to, multi color rectangular broadcast where packets can go along X+, Y+, Z, X− directions in a nonblocking manner with packets along Y+, Z+, X+, Y−. Each of these is represented by a color. Packets along one color do not block the other colors.

Phase-independence guarantees that some collective operation phases are independent. That is, the tasks in one phase are not dependent on the tasks in another phase. An executor component shown in FIG. 1 may provide the functionalities of optimization.

In a broadcast for example, the same data is sent in all phases. Each none root node receives the data once and sends data many times. Hence the data transfer operations in the different phases are independent of each other and can be done simultaneously.

Data Transfer Support

A collective framework in the system and method of the present disclosure is network device independent. It functions with an external support for message passing for processors to communicate with each other in a collective operation. The data transfer in one embodiment may be through a published multisend interface. For instance, the collective framework of the present disclosure may be built on top of a lower level messaging library which provides the multisend call implementation.

Figure 2A:
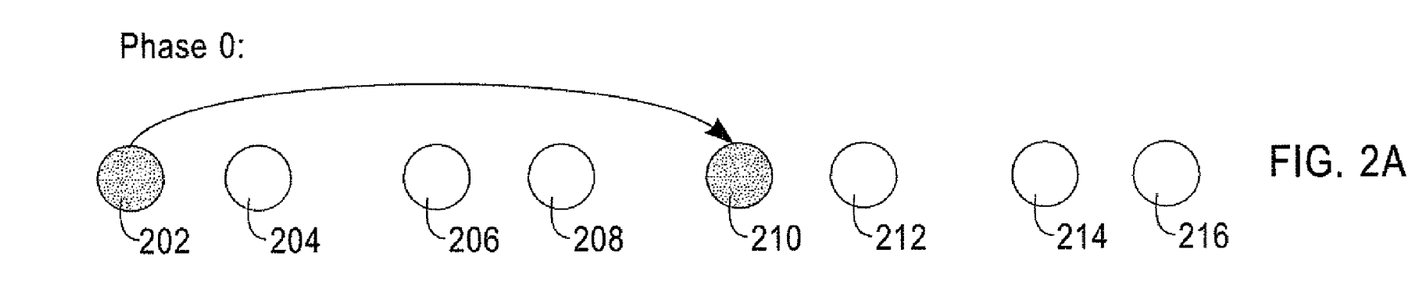
FIGS. 2A-2C show an example of a binomial broadcast schedule on eight computer nodes.
Figure 2B:
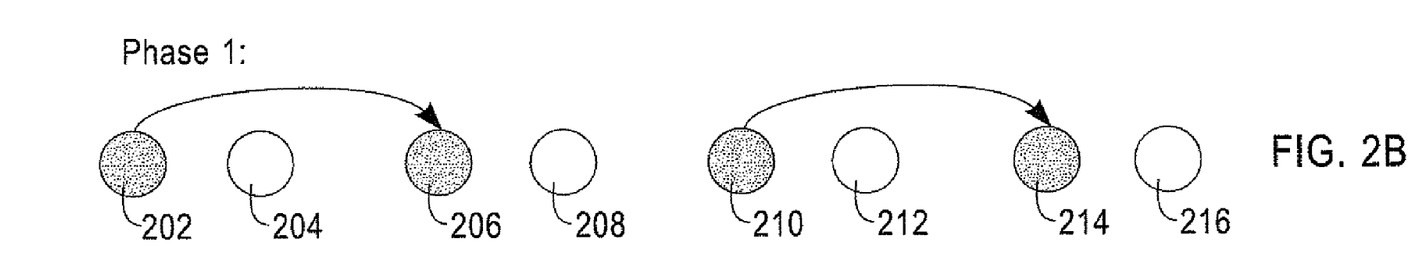
Figure 2C:
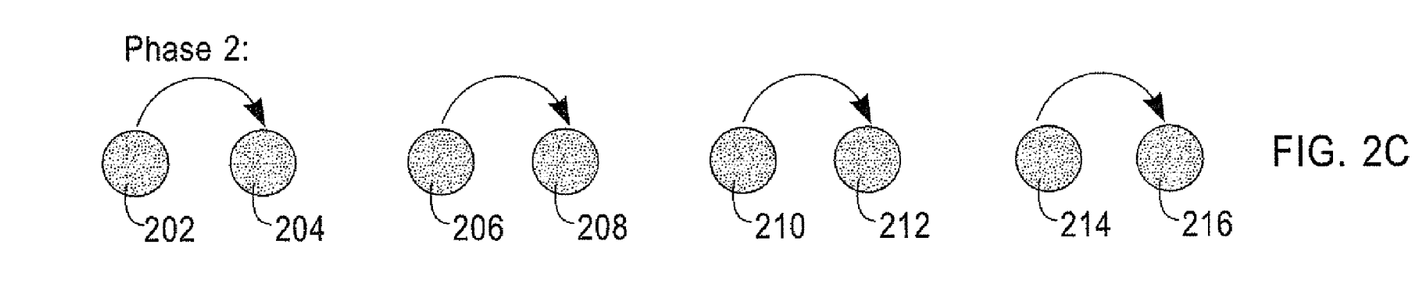

FIGS. 2A-2C show an example of a binomial broadcast schedule on eight computer nodes (202, 204, 206, 208, 210, 212, 214, 216). Assume that processor 0 is a root processor. A schedule on processor 0 (202) may include: at phase 0 shown in FIG. 2A, send data to processor 4 (210); at phase 1 shown in FIG. 2B, send data to processor 2 (206); at phase 2 shown in FIG. 2C, send data to processor 1 (204). A schedule on processor 4 (210) may look like: at phase 0 shown in FIG. 2A, receive data from processor 0 (202); at phase 1 shown in FIG. 2B, send data to processor 6 (214); at phase 2 shown in FIG. 2C, send data to processor 5 (212). A schedule on processor 1 (204) may include: at phase 0 shown in FIG. 2A, do nothing; at phase 1 shown in FIG. 2B, do nothing; at phase 2 shown in FIG. 2C, receive data from processor 0 (202). A schedule on processor 2 (206) may include: at phase 0 shown in FIG. 2A, do nothing; at phase 1 shown in FIG. 2B, receive data from processor 0 (202); at phase 2 shown in FIG. 2C, send data to processor 3 (208). A schedule on processor 3 (208) may include: at phase 0 shown in FIG. 2A, do nothing; at phase 1 shown in FIG. 2B, do nothing; at phase 2 shown in FIG. 2C, receive data from processor 2 (206). A schedule on processor 5 (212) may include: at phase 0 shown in FIG. 2A, do nothing; at phase 1 shown in FIG. 2B, do nothing; at phase 2 shown in FIG. 2C, receive data from processor 4 (210). A schedule on processor 6 (214) may include: at phase 0 shown in FIG. 2A, do nothing; at phase 1 shown in FIG. 2B, receive data from processor 4 (210); at phase 2 shown in FIG. 2C, send data to processor 7 (216). A schedule on processor 7 (216) may include: at phase 0 shown in FIG. 2A, do nothing; at phase 1 shown in FIG. 2B, do nothing; at phase 2 shown in FIG. 2C, receive data from processor 6 (214).

The above schedule is initially created or agreed upon among the processors involved in the collective operation. A schedule on each participating processor has a list of tasks specific to the respective processor's rank and the root of the collective. A schedule class may be written by a programmer who is aware of the collective operation and the topology constraints.

The executor executes the schedule and performs the sending and receiving of data as directed by the schedule. The executor calls multisend to do the actual data movement. For example, on the root there may be three calls to multisend to send the data shown in FIGS. 2A-2C. Depending on how many broadcasts are in flight the connection manager generates a unique connection identifier so that the data from the different broadcasts can be distinguished. For example, a broadcast on communicator (a group of processes in MPI) could use the communicator identifier as the connection identifier so that many broadcasts of different collectives can occur together.

Figure 3:
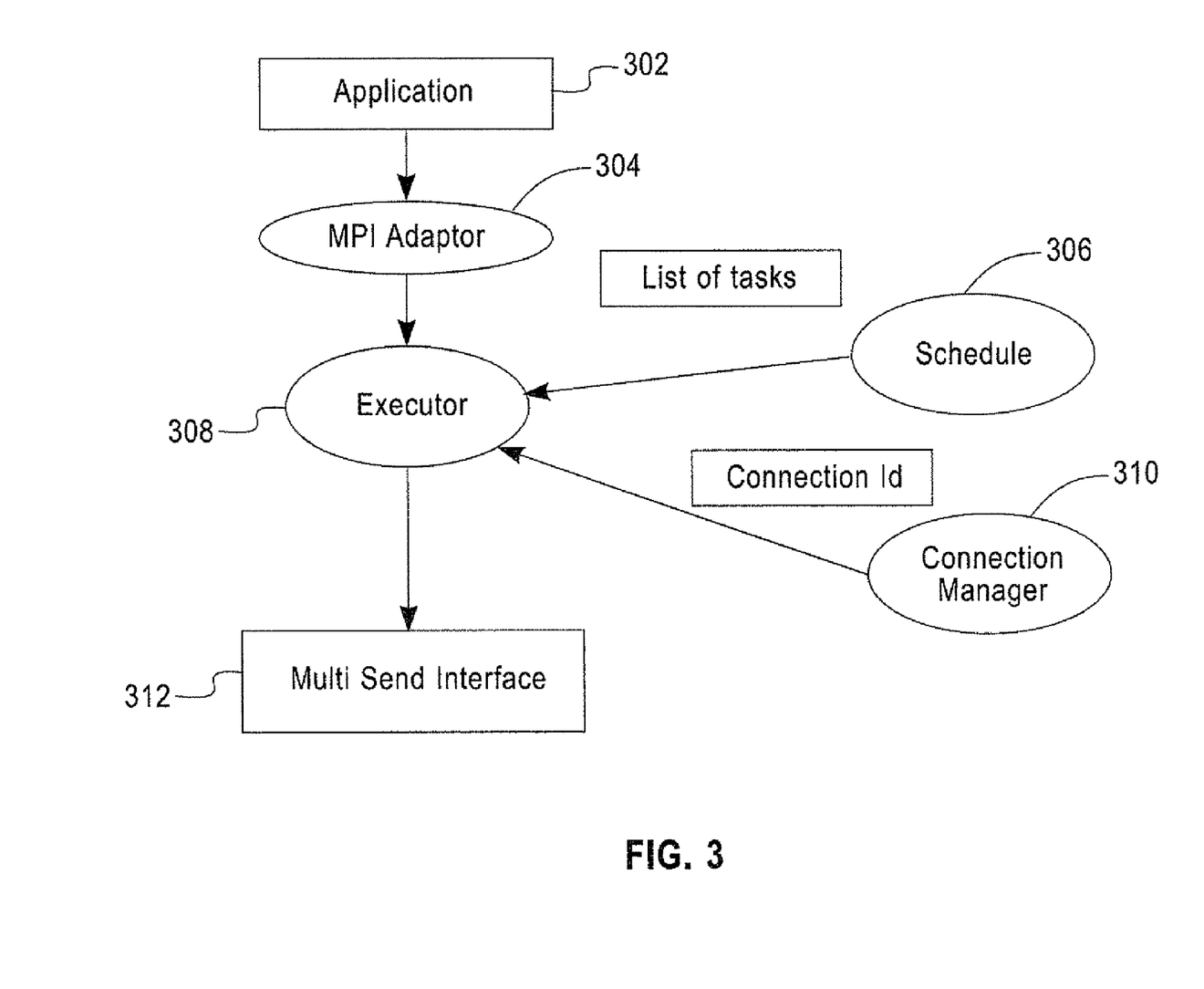
FIG. 3 is a functional view of a collective framework of the present disclosure in one embodiment.

FIG. 3 is a functional view of a collective framework of the present disclosure in one embodiment. An application program 302 calls a language adaptor 304 for the collective framework. The application program 302 can be any program, for instance, a user application or an application that is automatically run by the processor, etc. The adaptor 304 then creates an instance of an executor 308 and a schedule 306. The schedule 306 is based on the parameters with which the application program 302 invokes the language adaptor 304, or specified in any other manner by the application program 302. The executor 308 on creation retrieves a list of tasks from the schedule 306 and executes them by making multisend calls. Multisend calls are invoked via a multisend interface 312. A connection manager 310 manages a plurality of connections and provides a connection identifier associated with an available connection between a pair of processors. An executor 308, for example, may read this list of connection identifiers to use when making multisend calls. In another embodiment, multisend calls may retrieve available connection identifiers to use when sending data from the connection manager 310.

The present disclosure described a common programming paradigm for performing collective operations on parallel computers such as BlueGene/P. Examples of techniques that can be used to implement the common paradigm of the present disclosure may include but are not limited to following methods. Any other mechanism may be used to extend the collective framework of components. In a new parallel computer, a new multisend call may be implemented. Once that is done all the supported programming languages, i.e. for which adaptors have been designed can be supported on this platform. To support a new collective algorithm or optimization for a specific architecture a new schedule may be developed to take advantage of the new features in the architecture. To extend the framework to a new programming language, a new language adaptor may be developed. This would allow the collective calls in the programming language to use the general interfaces in the collective framework.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for supporting collective communications on a plurality of processors that use different parallel programming paradigms, comprising:
 a processor;
 a schedule module for defining one or more tasks in a collective operation, the collective operation being a function supported at least in a message passing interface (MPI) including at least a reduce operation, all-reduce operation, and all-to-all operation, in which a group of processors in parallel computer system participate to perform a global operation where each of the processors contribute to the global operation;
 an executor module for executing said one or more tasks;
 a multisend module for performing one or more data transfer functions in said one or more tasks;
 a connection manager for controlling one or more connections and identifying an available connection,
 the multisend module further for using the available connection in performing the one or more data transfer functions; and
 a language adaptor for interfacing at least to the multisend module,
 wherein the plurality of processors that use different parallel programming paradigms can use a common implementation of the schedule module, the executor module, the connection manager and the multisend module via the language adaptor specific to a parallel programming paradigm implemented on the processor,
 wherein the multisend module sends many messages at the same time, each message or a group of messages identified by a connection identifier.

2. The system of claim 1, wherein the schedule module, the executor module, the connection manager and the multisend module are created on each processor of a multiple processor system, the multiple processor system being connected by a tree network.

3. The system of claim 1, wherein the schedule module, the executor module, the connection manager and the multisend module are created on each processor of a multiple processor system, the multiple processor system being connected by a torous network with deposit bit sends.

4. The system of claim 1, wherein the schedule module defines one or more tasks in the collective operation per each phase of the collective operation.

5. The system of claim 1, wherein the executor module performs the one or more tasks using one or more optimizations.

6. The system of claim 5, wherein said one or more optimizations include pipelining, phase independence, or multicolor routes or combinations thereof.

7. The system of claim 1, wherein the multisend module performs data transfer using point-to-point communication.

8. The system of claim 1, wherein the multisend module is invoked for each phase of the collective operation.

9. The system of claim 1, wherein the executor module is created for each collective operation being performed.

10. A method of supporting collective communications on a plurality of processors that use different parallel programming paradigms, comprising:
 receiving an application call invoking a collective operation from a processor of the plurality of processors via a language adaptor, the collective operation being a function supported at least in a message passing interface (MPI) including at least a reduce operation, all-reduce operation, and all-to-all operation, in which a group of processors in parallel computer system participate to perform a global operation where each of the processors contribute to the global operation;
 creating a schedule module for defining one or more tasks in the collective operation;
 creating an executor module for executing said one or more tasks;
 invoking a multisend module to perform one or more data transfer functions associated with said one or more tasks,
 creating a connection manager to control one or more connections and identifying an available connection; and
 the multisend module further uses the available connection in performing the one or more data transfer functions,
 wherein the plurality of processors that use different parallel programming paradigms can use a common implementation of the schedule module, the executor module, the connection manager and the multisend module via the language adaptor specific to a parallel programming paradigm implemented on the processor, and wherein the multisend module sends many messages at the same time, each message or a group of messages identified by a connection identifier.

11. The method of claim 10, further including:

invoking the multisend module for each phase of the collective operation.

12. The method of claim 10, further including:

performing one or more optimizations during executing said one or more tasks.

13. The method of claim 12, wherein said one or more optimizations include pipelining, phase independence, or multi-color routing, or combinations thereof.

14. The method of claim 10, wherein the plurality of processors is connected by a tree network.

15. The method of claim 10, wherein the plurality of processors is connected by a torus network with deposit bit sends.

16. A non-transitory program storage device readable by a machine, tangibly embodying a program of instructions executable by the machine to perform a method of supporting collective communications on a plurality of processors that use different parallel programming paradigms, comprising:

receiving an application call invoking a collective operation from a processor of the plurality of processors via a language adaptor, the collective operation being a function supported at least in a message passing interface (MPI) including at least a reduce operation, all-reduce operation, and all-to-all operation, in which a group of processors in parallel computer system participate to perform a global operation where each of the processors contribute to the global operation;

creating a schedule module for defining one or more tasks in the collective operation;

creating an executor module for executing said one or more tasks;

invoking a multisend module to perform one or more data transfer functions associated with said one or more tasks;

creating a connection manager to control one or more connections and identifying an available connection; and the multisend module further uses the available connection in performing the one or more data transfer functions, wherein the plurality of processors that use different parallel programming paradigms can use a common implementation of the schedule module, the executor module, the connection manager and the multisend module via the language adaptor specific to a parallel programming paradigm implemented on the processor, and wherein the multisend module sends many messages at the same time, each message or a group of messages identified by a connection identifier.

17. The program storage device of claim 16, further including:

invoking the multisend module for each phase of the collective operation.

* * * * *